United States Patent [19]

Manabe et al.

[11] Patent Number: 5,578,533

[45] Date of Patent: Nov. 26, 1996

[54] CERAMIC COLOR COMPOSITION AND PROCESS FOR PRODUCING A CURVED SURFACE GLASS SHEET EMPLOYING IT

[75] Inventors: Tsuneo Manabe; Hitoshi Onoda; Hiroshi Usui, all of Yokohama, Japan

[73] Assignee: Asahi Glass Company Ltd., Tokyo, Japan

[21] Appl. No.: 314,290

[22] Filed: Sep. 30, 1994

[30] Foreign Application Priority Data

Oct. 1, 1993 [JP] Japan .................................. 5-246737
May 20, 1994 [JP] Japan .................................. 6-106828

[51] Int. Cl.[6] .............................. C03C 8/14; C03C 8/12; C03C 3/064
[52] U.S. Cl. ................................ 501/17; 501/23; 501/77; 501/32
[58] Field of Search ................................. 501/17, 23, 77, 501/32

[56] References Cited

U.S. PATENT DOCUMENTS

| | | | |
|---|---|---|---|
| 4,959,090 | 9/1990 | Reinherz | 501/17 |
| 5,093,285 | 3/1992 | Murkens | 501/17 |
| 5,203,902 | 4/1993 | Murkens | 501/17 |
| 5,244,484 | 9/1993 | Chiba et al. | 65/24 |
| 5,252,521 | 10/1993 | Roberts | 501/17 |
| 5,308,803 | 5/1994 | Clifford et al. | 501/17 |
| 5,332,412 | 7/1994 | Manabe et al. | 65/60.2 |
| 5,421,877 | 6/1995 | Hayakawa et al. | 501/23 |

*Primary Examiner*—Mark L. Bell
*Assistant Examiner*—Louis M. Troilo
*Attorney, Agent, or Firm*—Oblon, Spivak, McClelland, Maier & Neustadt, P.C.

[57] ABSTRACT

A ceramic color composition comprising, as inorganic components, from 5 to 35 wt % of a colored heat resistant pigment powder, from 65 to 95 wt % of a crystalizable glass powder and from 0 to 10 wt % of a refractory filler powder, wherein said glass powder consists essentially of from 10 to 24 wt % of $SiO_2$, from 60 to 75 wt % of $Bi_2O_3$, from 0 to 15 wt % of $B_2O_3$, from 0 to 4 wt % of $Li_2O+Na_2O+K_2O$, from 0 to 15 wt % of BaO and from 0 to 3 wt % of $TiO_2$.

5 Claims, No Drawings

CERAMIC COLOR COMPOSITION AND PROCESS FOR PRODUCING A CURVED SURFACE GLASS SHEET EMPLOYING IT

BACKGROUND OF THE INVENTION

1. Field of the Invention

The present invention relates to a ceramic color composition and a process for producing a curved surface glass sheet employing it.

2. Discussion of Background

A ceramic color paste for an automobile has been widely used, which is designed so that a ceramic color composition in the form of a paste is screen-printed on the periphery or the center portion of a window glass of an automobile and dried, and then baked during a step of heating the glass sheet for bending.

This ceramic color paste is used for such a purpose that when baked on the periphery of the glass sheet, it forms a colored opaque layer to prevent deterioration of a urethane sealant by ultraviolet rays or to prevent seeing through of e.g. heating wire terminals from outside the vehicle. As a composition for such a purpose, a composition is known wherein a various heat resistant colored pigment is mixed to a base material of a low melting point amorphous glass or crystallizable glass containing lead as the main component. As such a glass, the one comprising 53.24 wt % of PbO, 30.78 wt % of $SiO_2$, 0.68 wt % Of $ZrO_2$, 3.13 wt % of $Al_2O_3$, 9.66 wt % of $B_2O_3$ and 2.56 wt % of CdO is, for example, known (Japanese Unexamined Patent Publication No. 160845/1989). However, such a glass contains lead and cadmium and accordingly has a possibility of a problem from the aspect of pollution or recycling. On the other hand, the following composition is known as a glass containing no lead or cadmium (Japanese Unexamined Patent Publication No. 34537/1990).

$Bi_2O_3$: 25 to 45 wt %

$SiO_2$: 25 to 35 wt %

$B_2O_3$: 10 to 25 wt %

Alkali metal oxides: 4 to 19 wt %

$ZrO_2$: 0 to 3 wt %

$TiO_2$: 0 to 5 wt %

$ZrO_2+TiO_2$: 0.3 to 8 wt %

Further, the following composition is also known (Japanese Unexamined Patent Publication No. 180730/1990).

$Bi_2O_3$: 45 to 65 wt %

$SiO_2$: 25 to 36 wt %

$B_2O_3$: 4 to 6 wt %

$TiO_2$: 3 to 6 wt %

$Na_2O$: 1 to 3 wt %

$K_2O$: 0.5 to 2 wt %

$Li_2O$: 2 to 6 wt %

Furthermore, U.S. Pat. No. 4,959,090 discloses a composition having silicon incorporated to a lead-alumina-borosilicate frit.

On the other hand, in recent years, a production system so-called an in-furnace bending method is employed as a bending method for a window glass for an automobile, for the purpose of improving the productivity and the bending precision, wherein a pressing apparatus or a bending and suction molding apparatus is provided in a heating furnace so that the bending operation is conducted in the furnace.

However, if the above-mentioned ceramic color paste is used for the in-furnace bending method, there will be a problem such that the ceramic color composition adheres to a heat resistant cloth such as a glass cloth which is commonly used on the surface of the pressing mold or a suction mold for bending, whereby so-called mold release tends to be poor, and the productivity will be low. On the other hand, the ceramic color paste containing no lead or cadmium usually has a large expansion coefficient, and when such a paste is baked on a glass sheet, the strength of the glass sheet tends to be impaired, and it has an additional problem such that the chemical durability of the ceramic color composition is inadequate.

SUMMARY OF THE INVENTION

It is an object of the present invention to solve the above-mentioned problems inherent to the prior art and to provide a ceramic color composition which contains no lead or cadmium and yet does not impair the strength of the glass sheet and which is excellent in the mold release property, and a process for producing a curved surface glass sheet employing such a ceramic color composition.

The present invention provides a ceramic color composition of a first type comprising, as inorganic components, from 5 to 35 wt % of a colored heat resistant pigment powder, from 65 to 95 wt % of a crystallizable glass powder and from 0 to 10 wt % of a refractory filler powder, wherein said glass powder consists essentially of from 10 to 24 wt % of $SiO_2$, from 60 to 75 wt % of $Bi_2O_3$, from 0 to 15 wt % of $B_2O_3$, from 0 to 4 wt % of $Li_2O+Na_2O+K_2O$, from 0 to 15 wt % of BaO and from 0 to 3 wt % of $TiO_2$.

The present invention also provides a ceramic color composition of a second type to be baked on a sheet glass, comprising, as inorganic components, from 5 to 35 wt % of a heat resistant pigment powder, from 65 to 95 wt % of a bismuth-containing low melting point glass powder, from 0 to 10 wt % of a refractory filler powder and from 0.1 to 10 wt % of silicon.

Further, the present invention provides a process for producing a curved surface glass sheet employing such a ceramic color composition of the first or second type.

DETAILED DESCRIPTION OF THE PREFERRED EMBODIMENTS

The ceramic color composition of the present invention is suitably baked on a glass sheet commonly used for windows, i.e. a soda lime silica glass sheet of a composition comprising from 68 to 74 wt % of $SiO_2$, from 0.5 to 2 wt % of $Al_2O_3$, from 7 to 12 wt % of CaO, from 0.2 to 5 wt % of MgO and from 9 to 15 wt % of $Na_2O$. Namely, when heated, a part of the crystallizable glass powder will crystallize, whereby the glass ceramic color composition will be baked on the glass sheet, and will not adhere to a mold in the press bending step.

In the ceramic color composition of the first type of the present invention, if the content of the colored heat resistant pigment powder is less than 5 wt %, a desired concentration of the pigment tends to be hardly obtained. On the other hand, if it exceeds 35 wt %, the amount of the glass component tends to be too little, whereby it tends to be difficult to bake the composition to the glass sheet at a temperature for bending the glass sheet. Preferably, the content is from 7 to 30 wt %. As such a colored heat resistant pigment, the one composed mainly of an oxide of iron and manganese, the one composed mainly of an oxide of copper and chromium, or the one composed mainly of an oxide of cobalt and chromium, may, for example, be mentioned.

The refractory filler powder is not essential. However, by incorporating this refractory filler powder, it is possible to control the thermal expansion coefficient or to control the fluidity. If the content of the refractory filler powder exceeds 10 wt %, the glass component tends to be too little, and it becomes difficult to bake the composition to the glass sheet at a temperature for bending the glass sheet. As such a refractory filler, α-alumina, α-quartz, zircon, cordierite, forsterite or bismuth titanate may, for example, be mentioned.

Further, a metal or boride may be incorporated as a colorant or a release agent within a range of from 0 to 10 wt % in the total amount of the ceramic color composition. If the amount exceeds 10 wt %, the glass component tends to be too little, and it becomes difficult to bake the composition to the glass sheet at the temperature for bending the glass sheet. As the metal constituting such metal or boride, Ni, Sn, Ti, Mn, Fe, Cu, Ag, La, Zr, Co, Mo, Cr or Ce may, for example, be mentioned.

If the content of the crystallizable glass powder is less than 65 wt %, it tends to be difficult to bake the composition to the glass sheet at a temperature for bending the glass sheet, and if it exceeds 95 wt %, the content of the colored heat resistant pigment powder tends to be too small, whereby a desired concentration of the pigment tends to hardly be obtained.

The reasons for defining the composition of such a crystallizable glass are as follows.

$SiO_2$ serves as a network former and a crystallizing component of the glass, and it is essential also for the control of the chemical, thermal and mechanical properties. If its content is less than 10 wt %, the chemical durability tends to be poor, and if it exceeds 24 wt %, the glass softening point tends to be too high, and it will be difficult to bake the composition to the glass sheet at the temperature for bending the glass sheet. Preferably, it is within a range of from 13 to 22 wt %.

$Bi_2O_3$ is essential as a flux component and a crystallizing component. If its content is less than 60 wt %, the glass softening point tends to be too high, and if it exceeds 75 wt %, the chemical durability tends to be poor. Preferably, it is within a range of from 62 to 72 wt %.

$B_2O_3$ serves as a flux and is not essential. If it exceeds 15 wt %, the mold release property tends to be poor. Preferably, its content is within a range of from 5 to 10 wt %.

$Li_2O$, $Na_2O$ and $K_2O$ are not essential. However, if at least one of them is incorporated, as a flux component, the melting property of the glass can be remarkably improved. However, if the content exceeds 4 wt % in their total amount, the thermal expansion coefficient of the composition after sintering tends to be large, whereby the strength of the glass sheet will be low. Preferably, their total content is within a range of from 0.1 to 3 wt %.

BaO is not an essential component, but it has been found that when it is incorporated, the softening and fluidity of the glass are remarkably improved. However, if its content exceeds 15 wt %, the mold release property and the acid resistance tend to deteriorate.

$TiO_2$ is not an essential component, but it may be incorporated, as the case requires, for adjusting the sintering temperature, the chemical durability or the thermal expansion coefficient, within a range not to impair the homogeneity of the crystallizable glass. However, if its content exceeds 3 wt %, crystals of bismuth titanate tend to precipitate, whereby the thermal expansion coefficient will increase to impair the strength of the glass sheet, such being undesirable.

This crystallizable glass may contain, in addition to the above components, additional components such as $Al_2O_3$, $La_2O_3$, $ZrO_2$, $SnO_2$, MgO, CaO, SrO, ZrO, $P_2O_5$ and $CeO_2$, as the case requires, for adjusting the sintering temperature, the chemical durability or the thermal expansion coefficient, within a range not to impair the homogeneity of the crystallizable glass.

This glass is a crystallizable glass which is capable of precipitating a large amount of bismuth silicate as main crystals within a temperature range of from 570° to 700° C. This temperature range corresponds to the temperature range for bending a soda lime silica glass sheet as a window glass for vehicles. Accordingly, when the above ceramic color composition is coated on a desired portion of a glass sheet, and the glass sheet is subjected to heat bending treatment, a part of the crystallizable glass will crystallize to increase an apparent viscosity, whereby the composition is free from adhering to the pressing mold.

The weight average particle sizes of the powders of the above-mentioned respective materials are preferably within a range of from 0.1 to 10 μm, and if the weight average particle sizes are smaller than 0.1 μm, the productivity will be substantially poor, and such materials will be expensive, such being undesirable. On the other hand, if they exceed 10 μm, the screen printing property of the paste tends to be poor, such being undesirable. The weight average particle sizes are preferably from 1 to 6 μm.

The ceramic color composition of the second type of the present invention is the one which further improves the strength of the sheet glass to which it is applied.

In the ceramic color composition of the second type of the present invention, if the content of the heat resistant pigment powder is less than 5 wt %, a desired concentration of the pigment tends to be hardly obtained. If it exceeds 35 wt %, the amount of the glass component tends to be too small, and it becomes difficult to bake the composition to the sheet glass at the temperature for bending the sheet glass. Preferably, it is from 7 to 30 wt %. As such a heat resistant pigment, the one composed mainly of an oxide of iron and manganese, the one composed mainly of an oxide of copper and chromium, or the one composed mainly of an oxide of cobalt and chromium, may, for example, be mentioned.

If the content of the low melting point glass powder is less than 65 wt %, it tends to be difficult to bake the composition to the sheet glass at a temperature for bending the sheet glass. If it exceeds 95 wt %, the content of the heat resistant pigment powder tends to be small, whereby a desired concentration of the pigment tends to be hardly obtained. This low melting glass contains bismuth and has a function of improving the strength of the curved surface glass sheet in cooperation with silicon. As such a low melting point glass, the content of bismuth is preferably at least 25 wt % has calculated as $Bi_2O_3$. Particularly preferred is the one having the following composition.

Namely, the one which consists essentially of:

$SiO_2$: 10 to 36 wt %

$Bi_2O_3$: 25 to 75 wt %

$B_2O_3$: 0 to 25 wt %

$Li_2O$: 0 to 15 wt %

$Na_2O$: 0 to 15 wt %

$K_2O$: 0 to 15 wt %

BaO: 0 to 19 wt %

$TiO_2$: 0 to 10 wt %

Among them, if the content of $SiO_2$ is less than 10 wt %, the chemical durability tends to be low, such being undesirable. If it exceeds 36 wt %, the glass softening point tends to be too high, and it will be difficult to bake the composition to the sheet glass at the temperature for bending the sheet glass.

If the content of $Bi_2O_3$ is less than 25 wt %, the glass softening point tends to be too high, such being undesirable. If it exceeds 75 wt %, the chemical durability tends to be low, such being undesirable.

$B_2O_3$ is not an essential component, but when it is incorporated, it is possible to improve the melting property of the glass. However, if its content exceeds 25 wt %, the composition tends to adhere to the mold in the step for bending the sheet glass, and the mold release property tends to be low, such being undesirable.

$Li_2O$, $Na_2O$ and $K_2O$ are not essential components, but when they are incorporated, it is possible to improve the melting property of the glass. However, their content is up to 15 wt %, and if the total amount exceeds 15 wt %, the thermal expansion coefficient tends to be too large, whereby the strength of the curved surface glass will be low, such being undesirable.

BaO is not an essential component, but when it is incorporated, the fluidity of the glass can be improved. However, if its content exceeds 19 wt %, the mold release property and acid resistance tend to be low, such being undesirable.

$TiO_2$ is not an essential component, but when it is incorporated, it is possible to improve the chemical durability of the glass. However, if its content exceeds 10 wt %, devitrification is likely to result at the time of melting the glass, such being undesirable.

This low melting point glass may contain, in addition to the above component, additional components such as $Al_2O_3$, $ZrO_2$, $SnO_2$, MgO, CaO, SrO, ZnO, $P_2O_5$ and $CeO_2$, as the case requires, for adjusting the sintering temperature, the chemical durability or the thermal expansion coefficient, within a range not to impair the homogeneity of the glass.

When baked on a sheet glass, such a low melting point glass precipitates crystals of e.g. a bismuth-silicate type or bismuth titanate type.

The refractory filler powder is not essential, but when the refractory filler powder is incorporated, it is possible to control the thermal expansion coefficient or the fluidity. If the content of the refractory filler powder exceeds 10 wt %, the glass component tends to be small, and it becomes difficult to bake the composition to the sheet glass at the temperature for bending the sheet glass. As such a refractory filler, α-alumina, α-quartz, zircon, cordierite, forsterite, calcium titanate, strontium titanate, ballium titanate or bismuth titanate may, for example, be mentioned.

In the ceramic color composition of the present invention, silicon is required to be contained in an amount within a range of from 0.1 to 10 wt %. Silicon is effective to reduce the thermal expansion coefficient of the ceramic color composition and to improve the strength after baking the composition to the sheet glass. If the content of silicon is less than 0.1 wt %, the effect for improving the strength tends to be inadequate, and the effect for reducing the thermal expansion coefficient of the ceramic color composition tends to be small. If its content exceeds 10 wt %, the tissue after the baking, tends to be coarse, and the scratch resistance tends to be low. The content of silicon is preferably from 0.5 to 6 wt %.

Further, the ceramic color composition may further contain a metal other than silicon or its boride as a colorant or a release agent within a range of from 0 to 10 wt %. If it exceeds 10 wt %, the glass component tends to be too small, and it becomes difficult to bake the composition to the sheet glass at the temperature for bending the sheet glass. As the metal constituting such a metal or its boride, Ni, Sn, Ti, Mn, Fe, Cu, Ag, La, Zr, Co, Mo, Cr or Ce may, for example, be mentioned.

If the content of the low melting point glass powder is less than 65 wt %, it tends to be difficult to bake the composition to the sheet glass at the temperature for bending the sheet glass, and if it exceeds 95 wt %, the content of the heat resistant pigment powder tends to be too small, whereby a desired concentration of the pigment tends to be hardly obtained.

The weight average particle sizes of the powders of the above respective materials are preferably within a range of from 0.1 to 10 μm. If the weight average particle sizes are smaller than 0.1 μm, the productivity of such materials tends to be substantially poor, and such materials will be expensive, such being undesirable. On the other hand, if they exceed 10 μm, the screen printing property of the paste tends to be poor, such being undesirable. The weight average particle sizes are preferably from 1 to 6 μm.

In the process for producing a curved surface glass sheet according to the present invention, firstly, an organic vehicle is incorporated to such a ceramic color composition to obtain a paste. As the organic vehicle, the one obtained by dissolving a commonly employed polymer such as ethyl cellulose, an acrylic resin, a styrene resin, a phenol resin or a butyral resin in a solvent such as α-terpineol, butylcarbatol acetate or an phthalic acid ester, may be used.

Then, the ceramic color composition in the form of a paste is coated by a coating means such as screen printing on a desired portion of a glass sheet which is a soda lime silica glass commonly used as a window glass. The portion for coating is the peripheral portion of a front glass, a side glass or a rear glass in the case of a glass sheet for an automobile.

Then, the glass sheet having such a ceramic color composition coated thereon, is dried and then transferred to and heated in a heating furnace. The heating temperature is from 500° to 620° C., and the ceramic color composition will fuse to the glass sheet at that temperature.

Then, the glass is further maintained at a temperature of from 600° to 700° C., whereby the crystallizable glass in the ceramic color composition will be crystallized, whereby the ceramic color composition will be baked to the glass sheet. Then, the glass sheet is subjected to bending by a molding apparatus such as a pressing apparatus or a vacuum suction molding apparatus provided in the furnace in accordance with a conventional method. At that time, a stainless steel covered with a conventional glass fiber cloth is used as the mold for e.g. the pressing apparatus or the vacuum suction molding apparatus, and the glass sheet is pressed with the cloth interposed.

Now, the present invention will be described in further detail with reference to Examples. However, it should be understood that the present invention is by no means restricted to such specific Examples.

EXAMPLES 1—1 TO 1-12

(Ceramic color compositions of the first type)

Starting materials were formulated and mixed to form a glass composition (unit: weight %) as shown in Table 1, which was then melted and vitrified at a temperature of from 1,400° to 1,500° C. to obtain a crystallizable glass. Then, this crystallizable glass was pulverized by a ball mill to obtain a crystallizable glass powder having a weight average particle size of about 2.5 μm. This crystallizable glass powder, a black heat resistant pigment powder (#9510, manufactured by Dainichi Seika Kogyo K. K.) and a heat resistant filler (cordierite) were mixed in the weight ratio as shown in the column for the paste composition in Table 1.

Then, to 80 parts by weight of this mixed powder, 20 parts by weight of an α-terpineol solution having 10 wt % of ethyl cellulose dissolved therein, was added and kneaded, followed by homogeneous dispersion by a triple roll mill and adjustment to a desired paste viscosity to obtain a ceramic color composition in a paste form. The ceramic color composition in a paste form thus obtained, was screen-printed on the entire surface of a soda lime silica glass sheet (thickness: 3.5 mm, size: 10 cm$^2$) and then dried.

This glass sheet was heated to 650° C. to crystallize the crystallizable glass, whereby the ceramic color composition was baked on the glass sheet. Then, this glass sheet was pressed by a pressing mold provided in a furnace, whereupon the mold release property was evaluated. Further, the crystal phase precipitated from the glass in the ceramic color composition at that time, was identified by X-ray diffractometry, whereby the main crystals were all bismuth silicate.

Furthermore, with respect to the ceramic color composition of this glass sheet, the opacifying property and the acid resistance after immersing in 1N sulfuric acid for three days, were visually evaluated. The baked glass sheet was secured on a cylindrical jig with a diameter of 100 mm so that the printed side was located below, and the center of the glass sheet was pressed from above, whereupon the breaking load was measured. These results are also shown in Table 1.

In Comparative Examples 1—1 to 1–7, ceramic color compositions were prepared in the same manner as in Examples, and they were baked on glass sheets and evaluated in the same manner. The results are shown in Table 2.

With respect to the mold release property, the acid resistance and the opacifying property in Tables 1 and 2, symbol ⊙ represents "excellent", ○ represents "good", Δ represents "poor", and X represents "very poor".

As is apparent from Tables 1 and 2, the ceramic color compositions of the present invention are excellent or good in the mold release property, the acid resistance and the opacifying property, and they do not reduce the bending strength of glass sheets.

TABLE 1

| | | Examples | | | | | | | | | | | |
|---|---|---|---|---|---|---|---|---|---|---|---|---|---|
| | | 1-1 | 1-2 | 1-3 | 1-4 | 1-5 | 1-6 | 1-7 | 1-8 | 1-9 | 1-10 | 1-11 | 1-12 |
| Glass composition | $Bi_2O_3$ | 69.6 | 71.2 | 68.2 | 70.0 | 70.4 | 70.8 | 66.2 | 73.5 | 66.5 | 68.0 | 64.0 | 66.0 |
| | $SiO_2$ | 19.5 | 16.2 | 12.7 | 17.3 | 15.6 | 14.4 | 23.8 | 16.3 | 13.8 | 18.5 | 20.0 | 21.0 |
| | $B_2O_3$ | 7.0 | 9.8 | 5.5 | 6.4 | 7.2 | 6.0 | 8.6 | 5.8 | 13.0 | 6.5 | 3.5 | — |
| | $Li_2O$ | 0.4 | 0.2 | — | 0.2 | — | 0.1 | 0.2 | 0.4 | 0.1 | — | 1.0 | 0.7 |
| | $Na_2O$ | 1.5 | 0.7 | — | 0.7 | 0.5 | 0.3 | 1.2 | 0.3 | 0.3 | — | — | — |
| | $K_2O$ | — | — | — | — | 2.1 | — | — | — | — | — | — | — |
| | $Li_2O + Na_2O + K_2O$ | 1.9 | 0.9 | — | 0.9 | 2.6 | 0.4 | 1.4 | 0.7 | 0.4 | — | 1.0 | 0.7 |
| | BaO | — | — | 12.8 | 3.5 | 2.8 | 6.7 | — | 3.7 | 5.3 | 7.0 | 11.5 | 12.3 |
| | $TiO_2$ | 2.0 | 1.9 | 0.8 | 1.8 | 1.4 | 1.7 | — | — | — | 1.0 | — | — |
| Paste composition | Glass | 75 | 70 | 96 | 82 | 74 | 75 | 90 | 80 | 75 | 70 | 75 | 70 |
| | Heat resistant pigment | 25 | 25 | 16 | 18 | 26 | 75 | 10 | 20 | 25 | 25 | 20 | 25 |
| | Cordierite | — | 5 | 8 | — | — | — | — | — | — | 5 | 5 | 5 |
| Mold release property | | ⊙ | ⊙ | ⊙ | ⊙ | ⊙ | ⊙ | ⊙ | ⊙ | ○ | ⊙ | ⊙ | ⊙ |
| Acid resistance | | ⊙ | ⊙ | ○ | ⊙ | ⊙ | ⊙ | ⊙ | ○ | ⊙ | ⊙ | ⊙ | ⊙ |
| Opacifying property | | ⊙ | ⊙ | ⊙ | ⊙ | ⊙ | ⊙ | ○ | ⊙ | ⊙ | ⊙ | ⊙ | ⊙ |
| Glass sheet breaking load (kg) | | 57 | 67 | 68 | 61 | 58 | 64 | 63 | 54 | 56 | 62 | 63 | 61 |

TABLE 2

| | | Comparative Examples | | | | | | |
|---|---|---|---|---|---|---|---|---|
| | | 1-1 | 1-2 | 1-3 | 1-4 | 1-5 | 1-6 | 1-7 |
| Glass composition | $Bi_2O_3$ | 69.6 | 69.6 | 69.6 | 60.1 | 51.0 | 43.0 | 64.3 |
| | $SiO_2$ | 19.5 | 19.5 | 19.5 | 27.1 | 33.0 | 31.0 | 26.1 |
| | $B_2O_3$ | 7.0 | 7.0 | 7.0 | 3.5 | 5.0 | 14.0 | — |
| | $Li_2O$ | 0.4 | 0.4 | 0.4 | — | 3.0 | — | — |
| | $Na_2O$ | 1.5 | 1.5 | 1.5 | 4.1 | 2.0 | 6.5 | 4.2 |
| | $K_2O$ | — | — | — | — | 1.0 | — | — |
| | $Li_2O + Na_2O + K_2O$ | 1.9 | 1.9 | 1.9 | 4.1 | 6.0 | 6.5 | 4.2 |
| | BaO | — | — | — | — | — | — | — |
| | $TiO_2$ | 2.0 | 2.0 | 2.0 | 5.2 | 5.0 | 2.5 | 5.4 |
| | ZnO | — | — | — | — | — | 3.0 | — |
| Paste composition | Glass | 97 | 60 | 60 | 75 | 75 | 75 | 71 |
| | Heat resistant pigment | 3 | 40 | 25 | 25 | 25 | 25 | 29 |
| | Cordierite | — | — | 15 | — | — | — | — |
| Mold release property | | ⊙ | Baking failure | Baking failure | Δ | Δ | x | ⊙ |
| Acid resistance | | ⊙ | | | ⊙ | ⊙ | ○ | ⊙ |
| Opacifying property | | x | | | ⊙ | ⊙ | ⊙ | ⊙ |
| Glass sheet breaking load (kg) | | 69 | | | 51 | 38 | 40 | 48 |
| Main precipitated crystalline phase | | Bismuth silicate | Bismuth silicate | Bismuth silicate | Bismuth titanate | Bismuth titanate | Not precipitated | Bismuth titanate |

EXAMPLES 2-1 TO 2-3

(Ceramic color compositions of the second type)

Starting materials were formulated and mixed to form a glass composition (unit: wt %) as shown in Table 3, which was melted and vitrified at a temperature of from 1,200° to 1,500° C. Then, this glass was pulverized by ball mill to obtain a low melting point glass powder having a weight average particle size of about 2.5 μm. This low melting point glass powder, a black heat resistant pigment powder (#9510, manufactured by Dainichi Seika Kogyo K. K.), a heat resistant filler (alumina) and a metal powder (silicon, chromium, cobalt, copper, manganese, iron, nickel, tin, titanium or tungsten) were mixed in a weight ratio as shown in the column for the paste composition in Table 3 to obtain a ceramic color composition.

Then, to 80 parts by weight of this ceramic color composition, 20 parts by weight of an α-terpineol solution having 10 wt % of ethyl cellulose dissolved therein, was added and kneaded, followed by homogeneous dispersion by a triple roll mill and adjustment to a desired paste viscosity. A ceramic color composition in a paste form thus obtained, was screen-printed over the entire surface of a soda lime silica sheet glass (thickness: 3.5 mm, size: 10 cm$^2$) and then dried.

This sheet glass was heated to 650° C. and crystallized, whereby the ceramic color composition was baked on the sheet glass. The baked sheet glass was secured on a cylindrical jig with a diameter of 100 mm so that the printed surface was located below, and the center of the sheet glass was pressed from above, whereby the breaking load was measured, and the results are also shown in the Table. Further, in Comparative Examples 2-1 to 2-19, ceramic color compositions were prepared in the same manner as in Examples and baked on sheet glasses in the same manner, whereupon the breaking loads were measured. The results are also shown in Tables 3 to 5.

As is apparent from the Tables, among various powders, ceramic color compositions of the present invention wherein silicon was incorporated, remarkably improve the bending strength after baking onto the sheet glasses while maintaining excellent mold release properties and acid resistance. Further, the effect for improving the strength by the addition of silicon is particularly remarkable in combination with a bismuth-type glass rather than a lead-type glass.

TABLE 3

| | | Examples | | | Comparative Examples | | | |
|---|---|---|---|---|---|---|---|---|
| | | 2-1 | 2-2 | 2-3 | 2-1 | 2-2 | 2-3 | 2-4 |
| Glass composition | Bi$_2$O$_3$ | 70.7 | 64.3 | 64.5 | 70.7 | 70.7 | 70.7 | 70.7 |
| | SiO$_2$ | 16.5 | 20.0 | 25.1 | 16.5 | 16.5 | 16.5 | 16.5 |
| | B$_2$O$_3$ | 6.5 | 3.5 | — | 6.5 | 6.5 | 6.5 | 6.5 |
| | Li$_2$O | 0.4 | 0.7 | 1.3 | 0.4 | 0.4 | 0.4 | 0.4 |
| | Na$_2$O | — | — | 4.0 | — | — | — | — |
| | BaO | 3.8 | 11.5 | — | 3.8 | 3.8 | 3.8 | 3.8 |
| | TiO$_2$ | 2.1 | — | 5.1 | 2.1 | 2.1 | 2.1 | 2.1 |
| Paste composition | Glass | 75 | 70 | 80 | 75 | 75 | 75 | 75 |
| | Heat resistant pigment | 17 | 22 | 10 | 22 | 17 | 17 | 17 |
| | Alumina | 3 | 5 | 3 | 3 | 3 | 3 | 3 |
| | Metal powder | 5 | 3 | 7 | — | 5 | 5 | 5 |
| | | (Si) | (Si) | (Si) | | (Mn) | (Cr) | (Ni) |
| Glass sheet breaking load (kg) | | 90 | 87 | 70 | 56 | 58 | 54 | 55 |

TABLE 4

| | | Comparative Examples | | | | | | |
|---|---|---|---|---|---|---|---|---|
| | | 2-5 | 2-6 | 2-7 | 2-8 | 2-9 | 2-10 | 2-11 |
| Glass composition | Bi$_2$O$_3$ | 64.3 | 64.3 | 64.3 | 64.3 | 64.5 | 64.5 | 64.5 |
| | SiO$_2$ | 20.0 | 20.0 | 20.0 | 20.0 | 25.1 | 25.1 | 25.1 |
| | B$_2$O$_3$ | 3.5 | 3.5 | 3.5 | 3.5 | — | — | — |
| | Li$_2$O | 0.7 | 0.7 | 0.7 | 0.7 | 1.3 | 1.3 | 1.3 |
| | Na$_2$O | — | — | — | — | 4.0 | 4.0 | 4.0 |
| | BaO | 11.5 | 11.5 | 11.5 | 11.5 | — | — | — |
| | TiO$_2$ | — | — | — | — | 5.1 | 5.1 | 5.1 |
| Paste composition | Glass | 70 | 70 | 70 | 70 | 80 | 80 | 80 |
| | Heat resistant pigment | 25 | 22 | 22 | 22 | 17 | 10 | 10 |
| | Alumina | 5 | 5 | 5 | 5 | 3 | 3 | 3 |
| | Metal powder | — | 3 | 3 | 3 | — | 7 | 7 |
| | | | (Co) | (Sn) | (Fe) | | (Ti) | (W) |
| Glass sheet breaking load (kg) | | 52 | 52 | 54 | 57 | 40 | 42 | 41 |

TABLE 5

|  |  | Comparative Examples |  |  |  |  |  |  |  |
|---|---|---|---|---|---|---|---|---|---|
|  |  | 2-12 | 2-13 | 2-14 | 2-15 | 2-16 | 2-17 | 2-18 | 2-19 |
| Glass composition | PbO | 66.8 | 66.8 | 66.8 | 66.8 | 65.0 | 65.0 | 65.0 | 65.0 |
|  | $SiO_2$ | 20.2 | 20.2 | 20.2 | 20.2 | 16.5 | 16.5 | 16.5 | 16.5 |
|  | $B_2O_3$ | — | — | — | — | 5.0 | 5.0 | 5.0 | 5.0 |
|  | $Al_2O_3$ | 0.5 | 0.5 | 0.5 | 0.5 | 2.5 | 2.5 | 2.5 | 2.5 |
|  | $Li_2O$ | 0.3 | 0.3 | 0.3 | 0.3 | — | — | — | — |
|  | $Na_2O$ | 0.8 | 0.8 | 0.8 | 0.8 | 1.0 | 1.0 | 1.0 | 1.0 |
|  | $K_2O$ | 0.4 | 0.4 | 0.4 | 0.4 | — | — | — | — |
|  | $TiO_2$ | 11.0 | 11.0 | 11.0 | 11.0 | 10.0 | 10.0 | 10.0 | 10.0 |
| Paste composition | Glass | 70 | 70 | 70 | 70 | 80 | 80 | 80 | 80 |
|  | Heat resistant pigment | 30 | 27 | 27 | 27 | 20 | 15 | 15 | 15 |
|  | Metal powder | — | 3 (Si) | 3 (Mn) | 3 (Fe) | — | 5 (Si) | 5 (Ni) | 5 (Cr) |
| Glass sheet breaking load (kg) |  | 63 | 62 | 62 | 60 | 60 | 61 | 58 | 61 |

The ceramic color composition of the first type of the present invention is free from fusion to a pressing mold in the step of press bending a glass sheet and free from causing a deterioration of the strength and excellent in the appearance and the chemical durability and capable of producing a curved surface glass sheet such as a window glass for a vehicle containing no environmentally polluting substance such as lead.

The ceramic color composition of the second type of the present invention remarkably improves the strength after baking onto a soda lime silica sheet glass.

What is claimed is:

1. A ceramic color composition comprising, as inorganic components, from 5 to 35 wt % of a colored heat resistant pigment powder, from 65 to 95 wt % of a crystallizable glass powder and from 0 to 10 wt % of a refractory filler powder, wherein said glass powder consists essentially of from 10 to 22 wt % of $SiO_2$, from 60 to 75 wt % of $Bi_2O_3$, from 0 to 5 wt % of $B_2O_3$, from 0 to 4 wt % of $Li_2O+Na_2O+K_2O$, from 0 to 15 wt % of BaO and from 0 to 3 wt % of $TiO_2$.

2. The ceramic color composition according to claim 1, wherein said crystallizable glass powder is the one capable of precipitating bismuth silicate as the main crystalline phase by heat treatment at a temperature of from 600° to 700° C.

3. A ceramic color composition to be baked on a sheet glass, comprising, as inorganic components, from 5 to 35 wt % of a heat resistant pigment powder, from 65 to 95 wt % of a bismuth-containing low melting point glass powder, from 0 to 10 wt % of a refractory filler powder and from 0.1 to 10 wt % of silicon.

4. The ceramic color composition according to claim 3, wherein said low melting point glass powder contains bismuth in an amount of at least 25 wt % as calculated as $Bi_2O_3$.

5. The ceramic color composition according to claim 4, wherein said low melting point glass powder consists essentially of from 10 to 36 wt % of $SiO_2$, from 25 to 75 wt % of $Bi_2O_3$, from 0 to 25 wt % of $B_2O_3$, from 0 to 15 wt % of $Li_2O$, from 0 to 15 wt % of $Na_2O$, from 0 to 15 wt % of $K_2O$, from 0 to 19 wt % of BaO and from 0 to 10 wt % of $TiO_2$.

* * * * *